/ Patented May 23, 1950

2,509,183

UNITED STATES PATENT OFFICE 2,509,183

DIHYDRAZIDE-FORMALDEHYDE RESINS

Robert W. Auten, Jenkintown, Pa., assignor to Rohm & Haas Company, Philadelphia, Pa., a corporation of Delaware No Drawing. Application June 25, 1949,
Serial No. 101,479

4 Claims. (Cl. 260—72)

This invention relates to a new kind of nitrogenous resin. It relates to the preparation of resinous, thermosetting, condensation products of certain dihydrazides, aldehydes, and alcohols.

In accordance with this invention, thermosetting resinous products are prepared which, in comparison with other amino-resins, are characterized by high flexibility even in the cured or thermoset stage. The resins of this invention retain their flexibility when heated for long periods of time or at high temperatures and consequently are particularly well-suited for use in the preparation of heat-resistant varnishes and enamels.

The products of this invention are made by condensing an aldehyde, preferably formaldehyde, an alcohol, preferably an alkanol of three to twelve carbon atoms, and a distinctive kind of a symmetrical dihydrazide. The dihydrazides which can be used in the process of this invention are those which have the general formula

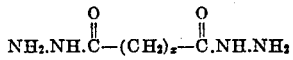

in which $x$ is an integer having a value from 4 to 8. These dihydrazides are prepared, for example, by the reaction of hydrazine and an ester of a dicarboxylic acid having the general formula

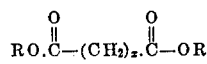

in which $x$ is an integer having a value of 4 to 8, and R represents a monovalent hydrocarbon group, preferably a lower alkyl group such as an ethyl group. Together with the hydrazide there are formed two moles of an alcohol, ROH. The dihydrazides which are employed are limited to those symmetrical dihydrazides of the following dicarboxylic acids: adipic, pimelic, suberic, azelaic and sebacic acids. The limitation of the dihydrazides to those in which $x$ has a value of 4 to 8 in the above general formula assures that the resins made therefrom will be characterized on the one hand by an unusual and inherent flexibility, and, on the other hand, by a rate of conversion to the insoluble or thermoset form and by a degree of chemical resistance which permit their use in commercial applications. Thus, the dihydrazides of acids containing fewer than four carbon atoms between the carbonyl groups are excluded because they do not impart adequate flexibility to the resinous condensates prepared therefrom and may also give rise to contaminating by-products, presumably by cyclization. Also, the dihydrazides containing more than eight carbon atoms between the carbonyl groups are excluded because they give rise to condensates which are deficient in speed of cure, hardness, gloss or solvent-resistance. Other amino-compounds such as urea, thiourea, melamine and the like are co-condensable with the dihydrazides and can be used in small amounts in conjunction with the latter but they detract from the unusual properties contributed by the dihydrazides.

Aldehydes which can be employed include formaldehyde, benzaldehyde, acetaldehyde, butyraldehyde, furfuraldehyde, and mixtures of two or more aldehydes, such as formaldehyde and acetaldehyde, formaldehyde and benzaldehyde, acetaldehyde and furfuraldehyde, and the like. Formaldehyde is the aldehyde of first choice, although very interesting resins result from the use of other aldehydes in conjunction with formaldehyde. While it is preferred that the formaldehyde be used in aqueous solution, as in formalin, it can also be used in its polymeric forms; e. g. as paraformaldehyde which yields formaldehyde under the conditions of the condensation reaction.

The ratio of aldehyde to dihydrazide can vary over reasonable limits. Thus, 1.5 to 6.0 moles of aldehyde per mole of dihydrazide can be employed, although it is much preferred to use a ratio of 3 to 4.5 moles per mole of dihydrazide. In this connection it is worthy of note that the dihydrazides are much more reactive than the corresponding amides of the same acids; and they have a "functionality," that is an ability to react with aldehydes, which far exceeds that of amides which ordinarily react with only one mole of aldehyde per amide,

group.

Alcohols which are reacted with the dihydrazides and aldehyde include those of the aliphatic and araliphatic series, although the much preferred class consists of the alkanols of 3 to 12 and particularly 3 to 8 carbon atoms and which, as the name implies, are unsubstituted and fully saturated. The alkanols can be straight-chained or branch-chained. The following are cited as examples of alcohols which are readily condensed with an aldehyde and a dihydrazide: benzyl, phenylethyl, cyclohexyl, ethyl, n-propyl, isopropyl, n-butyl, sec.-butyl, isobutyl, hexyl, octyl, 2-ethylhexyl, dodecyl, allyl, and methallyl alcohols as well as the isomers of the above. Condensates can also be made of the dihydrasides, aldehydes, and hydroxylated compounds in general, such as poylhydric alcohols including ethylene glycol and diethylene glycol, 1,6-hexandiol, glycerol, pentaerythritol, sorbitol, mannitol, carbohydrates in general, alkyd resins having free hydroxyl groups, and castor oil.

The amount of alcohol which is employed in making the resins of this invention may vary over wide limits because the alcohol not only reacts by etherification with the alkylol groups of the dihydrazide-aldehyde condensate but also serves as a solvent for the reaction mixture and for the product. As much as a hundred moles of the alcohol can be present per mole of dihydrazide, but there appears to be no advantage in employing such excessive amounts; and a maximum ratio of about 15 moles of alcohol per mole of dihydrazide is recommended. The important consideration is that sufficient alcohol react so as to impart to the resin solubility in hydrocarbon solvents such as toluene and xylene or in mixtures of alcohols and hydrocarbon solvents. It is well known that amino-resins become more soluble in hydrocarbons and cure more slowly to softer films as the size of the alcohol which is reacted therewith by etherification increases. Thus, for example, resins made from octyl alcohol are more soluble in hydrocarbons, oils, etc. and cure more slowly to softer films than do resins made from butanol, all other factors being equal. In the case of these dihydrazides, however, there is more involved, due to the unique structure of the dihydrazides which contain a polymethylene link between the two reactive terminal groupings. It is this hydrocarbon link which is now believed to impart flexibility to the resins of an order way beyond what is obtained by increasing the size of the etherified alcohol group. This flexibility is of a permanent or stable character and is not lost when the resin is aged or heated. The polymethylene link, unlike the etherified alcohol groups, is permanent or stable and is not split off, for example, when the resin is heated for a long time or at a high temperature. Accordingly, the resins of this invention behave as though they were plasticized. Thus, coatings made with them have the advantage of flexibility without the disadvantage of containing uncombined or even loosely combined extraneous material.

Although this invention relates to dihydrazide-aldehyde-alcohol resins, condensates of dihydrazides and formaldehyde have been prepared in the absence of alcohols. Such resins are water-soluble and are not used in conjunction with organic solvents but are used as aqueous dispersions and are recommended for use as plywood-adhesives and as impregnants for cloth and paper where their thermosetting qualities, combined with their inherent flexibility, give rise to products which in turn have most desirable properties.

The dihydrazide resins of this invention can be prepared by various procedures. Thus, for example, the alcohol, aldehyde and dihydrazide can be mixed and heated together until the desired end point is reached. This method is particularly suitable when the lower alcohol; e. g. isopropyl or butyl alcohols, are employed with an excess of alcohol present as solvent. Alternatively, the dihydrazide and aldehyde can first be condensed alone and then reacted with the alcohol. In any case, it appears that, in the first stage of reaction, the aldehyde and dihydrazide condense to form compounds containing alkylol groups and that the alcohol then reacts by etherification with these alkylol groups. It is advisable to prepare the reaction products of the higher alcohols; e. g. octyl and lauryl alcohols, by a process of transetherification. In this procedure, the condensate of the dihydrazide, aldehyde and a lower alcohol such as butanol is first prepared and this condensate is then heated with the higher alcohol. Transetherification occurs on heating and the radical of the higher alcohol replaces the radical of the lower alcohol in the condensate and the latter is liberated as free alcohol which can be readily recovered and reused. As the etherification progresses by reaction of the alcohol with the condensate, the product becomes increasingly soluble in hydrocarbon solvents such as toluene and xylene and also becomes increasingly compatible with such materials as oils, varnishes, alkyd resins and the like.

The reaction of the dihydrazide, aldehyde and alcohol is ordinarily conducted at a temperature between about 80° C. and the refluxing temperature of the reaction mixture at atmospheric pressure. Temperatures above the refluxing temperature can be used together with the application of pressure.

The pH of the reaction mixture is an important factor in the rate at which condensation takes place. Condensation proceeds more rapidly at the lower pH's. Ordinarily, the pH of the reaction mixture is lowered as the reaction progresses. Although the reaction may be carried out at a pH of 7.0, or even slightly on the alkaline side, it is desirable to operate under acidic conditions at pH's between 1.0 and 7.0 A particularly recommended range of pH is from 2.0 to 6.0.

An organic solvent, particularly a hydrocarbon solvent such as toluene or xylene, may be present during the condensation reaction. Alternatively, it may added after the condensation and serve as a solvent for the resinous product.

Following are examples which illustrate how the products of this invention are prepared.

*Example 1.*—The apparatus consisted of a three-neck balloon flask equipped with a mechanical stirrer, thermometer, condenser and water-separator filled with water-saturated xylene. To the flask was charged 230 grams of sebacic dihydrazide,

338 grams of a 35.5% solution of paraformaldehyde in butanol, and 78 grams of butanol. Stirring was maintained throughout the reaction. The mixture was heated to refluxing temperature (104° C.) and was held at this point until 50 cc. of water had been condensed and separated. The pH of the mixture was then lowered to 4.5 and maintained at that point by the addition of formic acid and refluxing was continued until 5 cc. of water had been separated. Thirty grams of xylene was added dropwise while an equal volume of distillate was removed. The sebacic dihydrazide-formaldehyde-butanol resin thus prepared had the following physical properties:

| | |
|---|---|
| Viscosity (Gardner-Holdt scale) | J+ |
| Color (point-varnish scale) | 8 |
| Resin-solids per cent | 54.5 |
| Acid number | 5 |
| Dilutability with xylene | Infinite |

This resin was compatible with a wide range of alkyd resins. Films were prepared by pouring the solution on glass plates, air-drying the same, and finally baking them at 250° F., 300° F. and 350° F. for varying periods from 1 up to 8 hours.

In all cases the films were hard, adhesive and flexible. In contrast, films prepared in a similar manner from a 50% solution of a commercially available urea-formaldehyde-butanol resin having a formaldehyde-to-urea ratio of two moles were in every case hard but extremely brittle and they flaked off the panels readily when the bake exceeded 30 minutes at any of the three temperatures.

In a similar manner, resins were prepared from adipic dihydrazide. These, like the product of Example 1, had an advantage in flexibility and adhesion over conventional urea-formaldehyde-butanol and urea-formaldehyde-octanol resins but they were not as flexible as the resins made from sebacic dihydrazide.

I claim:

1. As a new composition of matter, a toluene-soluble, thermosetting, resinous condensation product of (a) an alkanol containing 3 to 12 carbon atoms, (b) a dihydrazide, having the general formula

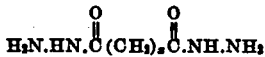

in which $x$ is an integer having a value of 4 to 8 inclusive, and (c) formaldehyde in an amount equal to 1.5 to 6.0 moles per mole of dihydrazide.

2. As a new composition of matter, a toluene-soluble, thermosetting, resinous condensation product of (a) an alkanol containing 3 to 12 carbon atoms, (b) a dihydrazide, having the general formula

in which $x$ is an integer having a value of 4 to 8 inclusive, and (c) formaldehyde in an amount equal to 3 to 4.5 moles per mole of dihydrazide.

3. As a new composition of matter, a toluene-soluble, thermosetting, resinous condensation product of (a) an alkanol containing 3 to 12 carbon atoms, (b) sebacic dihydrazide of the formula

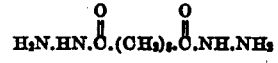

and (c) formaldehyde in an amount equal to 1.5 to 6.0 moles per mole of said sebacic dihydrazide.

4. As a new composition of matter, a toluene-soluble, thermosetting, resinous condensation product of (a) an alkanol containing 3 to 12 carbon atoms, (b) adipic dihydrazide of the formula

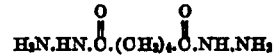

and (c) formaldehyde in an amount equal to 1.5 to 6.0 moles per mole of said adipic dihydrazide.

ROBERT W. AUTEN.

REFERENCES CITED

The following references are of record in the file of this patent:

UNITED STATES PATENTS

| Number | Name | Date |
|---|---|---|
| 2,210,442 | Balle | Aug. 6, 1940 |